United States Patent
Allen et al.

(10) Patent No.: US 9,703,773 B2
(45) Date of Patent: *Jul. 11, 2017

(54) PATTERN IDENTIFICATION AND CORRECTION OF DOCUMENT MISINTERPRETATIONS IN A NATURAL LANGUAGE PROCESSING SYSTEM

(71) Applicant: International Business Machines Corporation, Armonk, NY (US)

(72) Inventors: Corville O. Allen, Morrisville, NC (US); Elizabeth T. Dettman, Rochester, MN (US); Andrew R. Freed, Cary, NC (US); Michael T. Payne, Rochester, MN (US); Michael W. Schroeder, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/863,854

(22) Filed: Sep. 24, 2015

(65) Prior Publication Data

US 2016/0147733 A1    May 26, 2016

Related U.S. Application Data

(63) Continuation of application No. 14/550,218, filed on Nov. 21, 2014.

(51) Int. Cl.
*G06F 17/27* (2006.01)

(52) U.S. Cl.
CPC ...... *G06F 17/2775* (2013.01); *G06F 17/2785* (2013.01); *G06F 17/2795* (2013.01)

(58) Field of Classification Search
CPC ..... G10L 15/18; G10L 15/1815; G10L 15/19; G10L 15/197; G10L 15/26; G06F 17/20; G06F 17/24; G06F 17/27; G06F 17/273; G06F 17/2785; G06F 17/2795; G06F 17/2282

(Continued)

(56) References Cited

U.S. PATENT DOCUMENTS

| | | |
|---|---|---|
| 4,914,590 A | 4/1990 | Loatman et al. |
| 6,618,697 B1 | 9/2003 | Kantrowitz et al. |

(Continued)

OTHER PUBLICATIONS

Allen et al., "Pattern Identification and Correction of Document Misinterpretations in a Natural Language Processing System," U.S. Appl. No. 14/550,218, filed Nov. 21, 2014, 36 pages.

(Continued)

*Primary Examiner* — Martin Lerner
(74) *Attorney, Agent, or Firm* — VanLeeuwen & VanLeeuwen; Diana R. Gerhardt

(57) ABSTRACT

An approach is provided in which a knowledge manager analyzes multiple document phrases using a natural language processing model and generates multiple interpretations based upon the analysis. The knowledge manager identifies misinterpretation patterns by comparing the multiple interpretations with multiple corrections that include corrections to the multiple interpretations. In turn, the knowledge manager generates interpretation rules based upon the identified patterns and applies the interpretation rules to the natural language processing model.

4 Claims, 8 Drawing Sheets

(58) Field of Classification Search
USPC ....... 704/9, 10, 235, 257; 715/256, 257, 260
See application file for complete search history.

(56) References Cited

U.S. PATENT DOCUMENTS

| | | | |
|---|---|---|---|
| 6,810,376 B1 | 10/2004 | Guan et al. | |
| 7,006,967 B1 | 2/2006 | Kahn et al. | |
| 7,295,965 B2 | 11/2007 | Haigh et al. | |
| 7,383,172 B1 | 6/2008 | Jamieson | |
| 7,403,890 B2 | 7/2008 | Roushar | |
| 7,483,833 B2 | 1/2009 | Peters | |
| 7,565,282 B2 | 7/2009 | Carus | |
| 8,086,453 B2 | 12/2011 | Detlef et al. | |
| 8,135,576 B2* | 3/2012 | Haley | G06F 17/2785 704/257 |
| 8,161,041 B1 | 4/2012 | Grushetskyy et al. | |
| 8,176,418 B2 | 5/2012 | McKeown et al. | |
| 8,321,201 B1* | 11/2012 | Baker | G06F 17/2795 704/257 |
| 8,612,261 B1 | 12/2013 | Swanson et al. | |
| 8,744,848 B2 | 6/2014 | Hoepfinger et al. | |
| 8,856,004 B2* | 10/2014 | Basson | G10L 15/063 704/235 |
| 9,002,701 B2 | 4/2015 | Kandekar et al. | |
| 9,037,586 B2 | 5/2015 | De Saeger et al. | |
| 9,444,934 B2 | 9/2016 | Nelson et al. | |
| 2002/0052901 A1 | 5/2002 | Guo et al. | |
| 2003/0050772 A1 | 3/2003 | Bennett | |
| 2005/0049852 A1 | 3/2005 | Chao | |
| 2006/0178868 A1* | 8/2006 | Billerey-Mosier | G06F 17/2881 704/9 |
| 2006/0212441 A1 | 9/2006 | Tang et al. | |
| 2007/0088549 A1 | 4/2007 | Mowatt | |
| 2007/0299664 A1 | 12/2007 | Peters et al. | |
| 2009/0276215 A1 | 11/2009 | Hager | |
| 2010/0293451 A1 | 11/2010 | Carus | |
| 2012/0179682 A1 | 7/2012 | De Saeger et al. | |
| 2012/0222047 A1* | 8/2012 | Frohlich | G06F 11/3476 719/315 |
| 2012/0251016 A1* | 10/2012 | Lyons | G06F 17/274 382/276 |
| 2012/0304056 A1 | 11/2012 | Detlef et al. | |
| 2013/0251211 A1 | 9/2013 | Palm et al. | |
| 2014/0108013 A1 | 4/2014 | Di Cristo et al. | |
| 2014/0136199 A1 | 5/2014 | Hager | |
| 2014/0214401 A1 | 7/2014 | Li et al. | |
| 2015/0340033 A1* | 11/2015 | Di Fabbrizio | G10L 15/18 704/254 |
| 2016/0147734 A1* | 5/2016 | Allen | G06F 17/2775 704/9 |
| 2017/0039188 A1* | 2/2017 | Allen | G06F 17/289 |

OTHER PUBLICATIONS

"List of IBM Patents or Patent Applications Treated as Related," Letter from Leslie A. Van Leeuwen, Sep. 24, 2015, 1 page.
Final Office Action for U.S. Appl. No. 14/550,218, U.S. Patent and Trademark Office, mailed Jun. 23, 2016, 20 pages.
Office Action for U.S. Appl. No. 14/550,218, U.S. Patent and Trademark Office, mailed Feb. 29, 2016, 23 pages.
Office Action for U.S. Appl. No. 14/550,218, U.S. Patent and Trademark Office, mailed Nov. 23, 2016, 19 pages.
Notice of Allowance for U.S. Appl. No. 14/550,218, U.S. Patent and Trademark Office, mailed Feb. 8, 2017, 12 pages.

* cited by examiner

PATTERN IDENTIFICATION AND CORRECTION OF DOCUMENT MISINTERPRETATIONS IN A NATURAL LANGUAGE PROCESSING SYSTEM

BACKGROUND

Natural language processing systems typically derive meaning from human or natural language input using algorithms based on statistical inference. Natural language processing systems typically perform a "training" stage in which learning models automatically learn domain rules by analyzing a large corpora of documents and generating a knowledge base from which to access.

The learning models may execute syntactic analysis or semantic analysis at various levels during the training process. For syntactic analysis, the learning models utilize algorithms to predict part-of-speech tags for words in a given sentence (e.g., noun, verb, adjective), as well as the various relationships between the different words (e.g., subject, object and other modifiers). Semantic analysis involves using algorithms for noun-phrase extraction, tagging the extracted noun-phrases (e.g., person, organization, location, common noun, etc.), clustering noun-phrases referring to the same entity, resolving mentions of entities in documents against entities in the knowledge base, relation and knowledge extraction, etc. Once the natural language processing system completes the training stage, the natural language processing system answers questions, provides information to a user, and performs other tasks based upon the learning models and the generated knowledge base.

BRIEF SUMMARY

According to one embodiment of the present disclosure, an approach is provided in which a knowledge manager analyzes multiple document phrases using a natural language processing model and generates multiple interpretations based upon the analysis. The knowledge manager identifies misinterpretation patterns by comparing the multiple interpretations with multiple corrections that include corrections to the multiple interpretations. In turn, the knowledge manager generates interpretation rules based upon the identified patterns and applies the interpretation rules to the natural language processing model.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
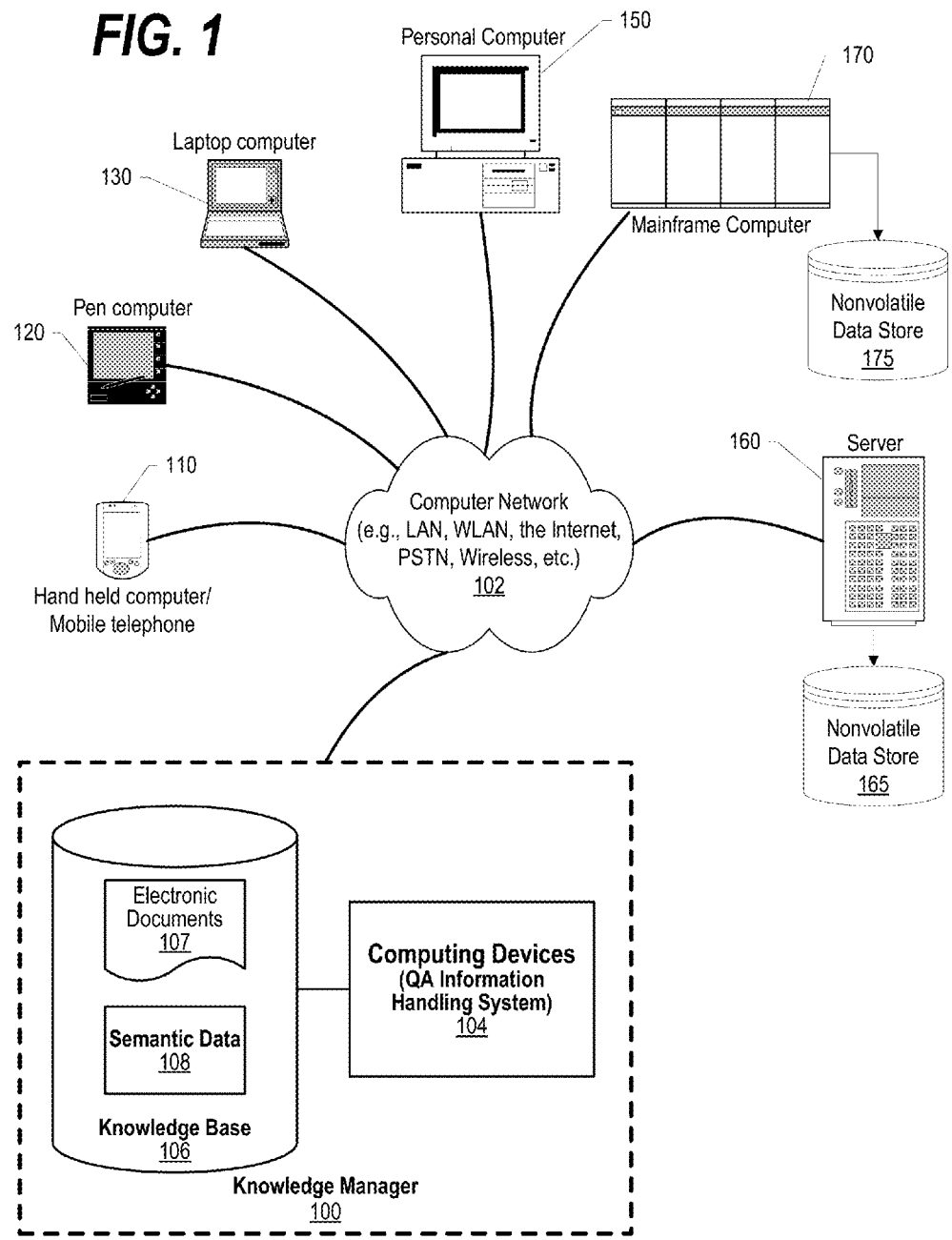
FIG. 1 depicts a schematic diagram of one illustrative embodiment of a knowledge manager system in a computer network.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 depicts a schematic diagram of one illustrative embodiment of a question/answer creation (QA) system 100 in a computer network 102. Knowledge manager 100 may include a computing device 104 (comprising one or more processors and one or more memories, and potentially any other computing device elements generally known in the art including buses, storage devices, communication interfaces, and the like) connected to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. Knowledge manager 100 and network 102 may enable question/answer (QA) generation functionality for one or more content users. Other embodiments of knowledge manager 100 may be used with components, systems, sub-systems, and/or devices other than those that are depicted herein.

Knowledge manager 100 may be configured to receive inputs from various sources. For example, knowledge manager 100 may receive inputs such as a corpus of electronic documents 107, semantic data 108, or other data over network 102 from a content creator, content users, and other possible sources of input. In one embodiment, some or all of the inputs to knowledge manager 100 may be routed through the network 102. The various computing devices 104 on the network 102 may include access points for content creators and content users. Some of the computing devices 104 may include devices for a database storing the corpus of data. The network 102 may include local network connections and remote connections in various embodiments, such that knowledge manager 100 may operate in environments of any size, including local and global, e.g., the Internet. Additionally, knowledge manager 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in a document 107 for use as part of a corpus of data with knowledge manager 100. The document 107 may include any file, text, article, or source of data for use in knowledge manager 100. Content users may access knowledge manager 100 via a network connection or an Internet connection to the network 102, and may input questions to knowledge manager 100 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions (e.g., natural language questions, etc.) to the knowledge manager. Knowledge manager 100 may interpret the question and provide a response to the content user containing one or more answers to the question. In some embodiments, knowledge manager 100 may provide a response to users in a ranked list of answers.

In some illustrative embodiments, knowledge manager 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize knowledge manager 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 100. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
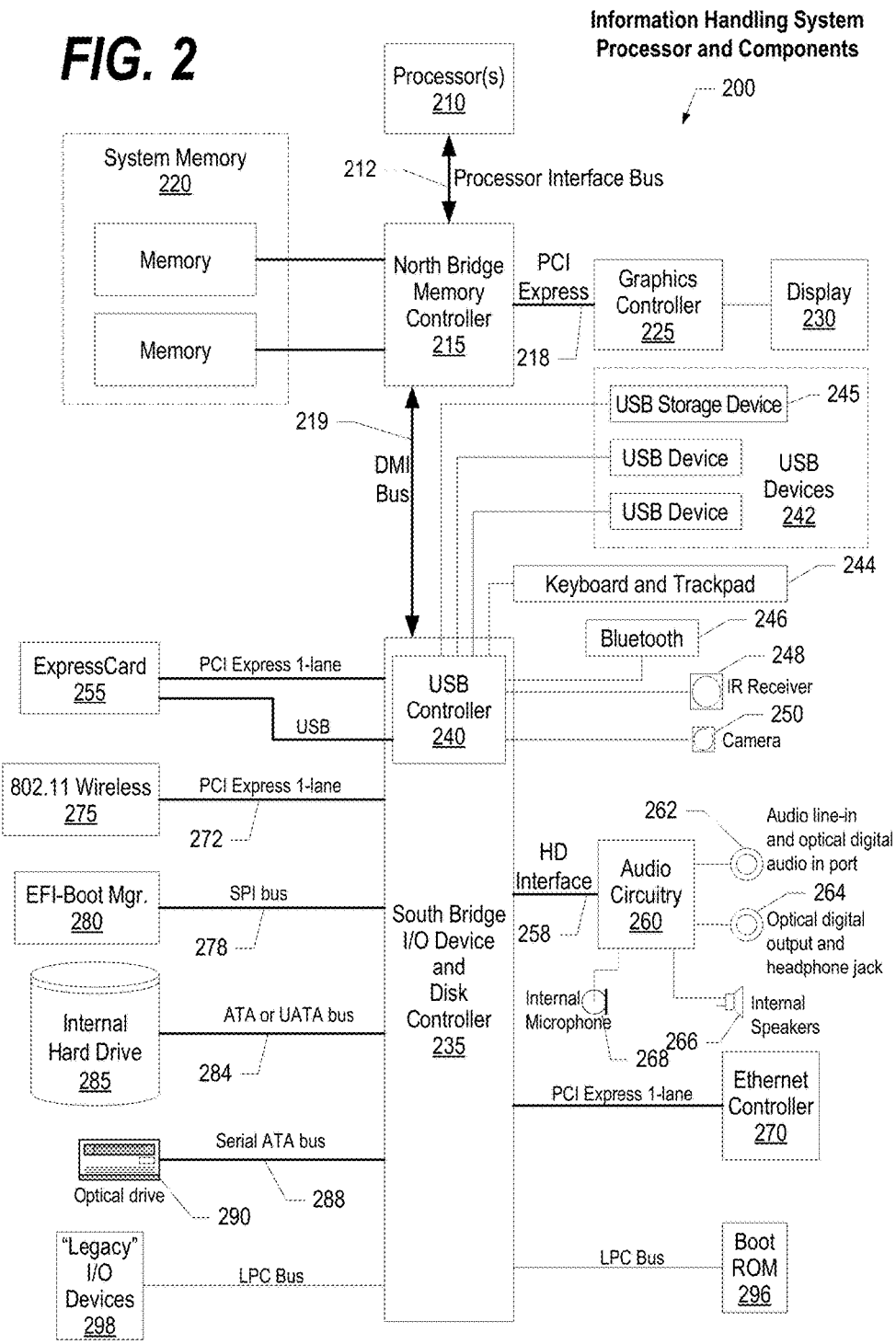
FIG. 2 illustrates an information handling system, more particularly, a processor and common components, which is a simplified example of a computer system capable of performing the computing operations described herein.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. Other components often included in Southbridge 235 include a Direct Memory Access (DMA) controller, a Programmable Interrupt Controller (PIC), and a storage device controller, which connects Southbridge 235 to non-volatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE 802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

FIGS. 3-8 depict an approach that can be executed on an information handling system. The information handling system analyzes multiple document phrases using a natural language processing model and generates interpretations based upon the analysis. The knowledge manager provides the interpretations to an interpretation analyzer (e.g., doctor, paralegal, etc.) and receives corrections from the interpretation analyzer accordingly. As such, the knowledge manager identifies patterns in the corrections by comparing the corrections with the interpretations and the document phrases. In turn, the knowledge manager generates interpretation rules based upon the identified patterns and applies the interpretation rules to the natural language processing model.

Figure 3:
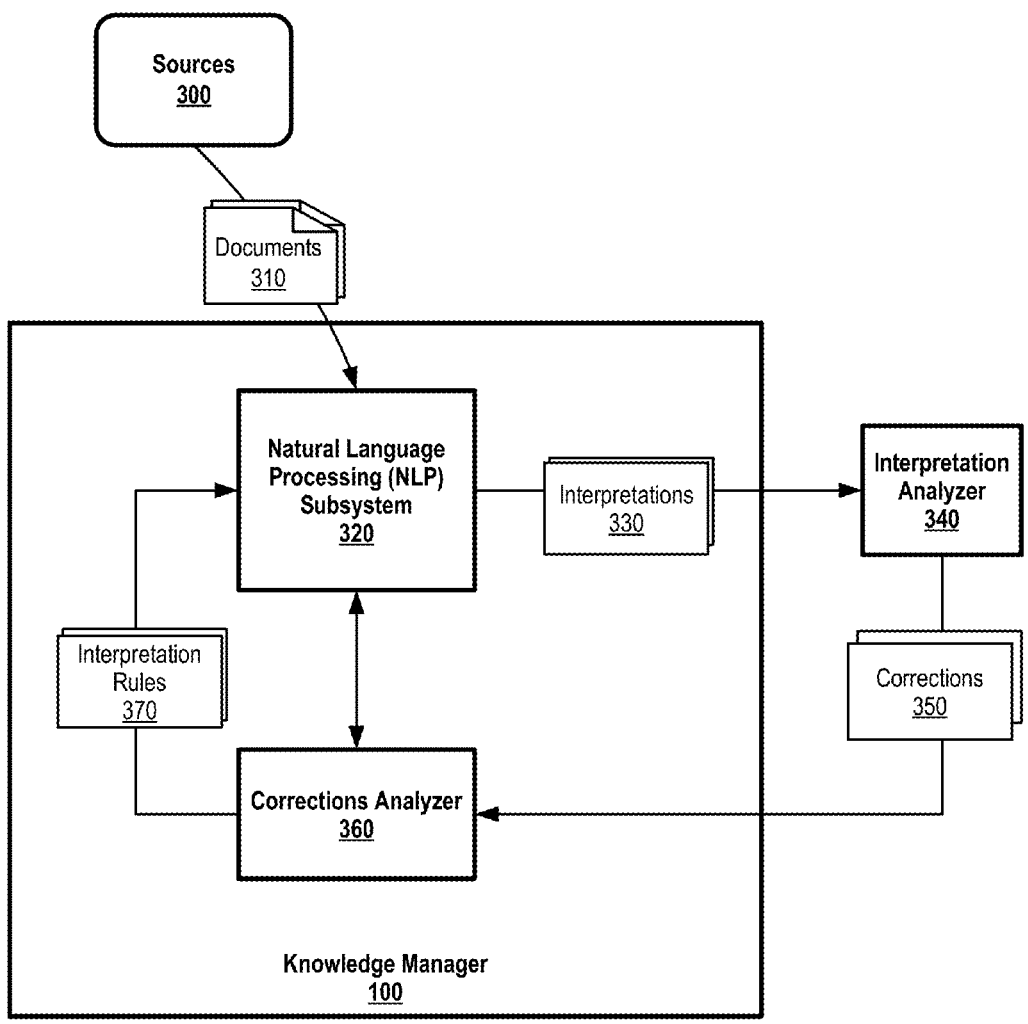
FIG. 3 is an exemplary diagram depicting a knowledge manager that identifies patterns in interpretation corrections and adjusts a natural language processing subsystem accordingly.

FIG. 3 is an exemplary diagram depicting a knowledge manager that identifies patterns in interpretation corrections and adjusts a natural language processing subsystem accordingly.

Knowledge manager 100 ingests documents 310 from sources 300 to train a learning model and create a knowledge base domain. For example, documents 310 may be medical articles, patient records, books, other sources of text, etc., which knowledge manager 100 ingests to generate a medical domain or a patient profile. Knowledge manager 100 includes natural language processing subsystem 320, which analyzes documents 310 and generates interpretations 330. Interpretations 330 are the "results" of natural language processing subsystem 320 applying the learning model to documents 310. For example, document 310 may include the phrase "patient has pneumonia" and natural language processing interpretation 330 includes "comorbidity pneumonia."

At times, natural language processing subsystem 320 misinterprets documents 310 during the training process, which results in some of interpretations 330 being incorrect. As such, knowledge manager 100 provides interpretations 330 to interpretation analyzer 340 to review. In one embodiment, interpretation analyzer 340 is a human such as a doctor, law enforcement professional, paralegal, etc. In another embodiment, interpretation analyzer 340 is a computer system that compares interpretations 330 with phrases in documents 310. In this embodiment, interpretation analyzer 340 may be part of knowledge manager 100 or separate from knowledge manager 100 as shown in FIG. 1.

Interpretation analyzer 340 generates corrections 350 from analyzing interpretations 330, which include correct interpretations of documents 310. For example, documents 310 may include a phrase of "No motive has been identified for suspect A" and a corresponding interpretation 330 may be "suspect A has motive." In this example, interpretation analyzer 340 may write a correction 350 of "suspect A has no motive."

Figure 4:
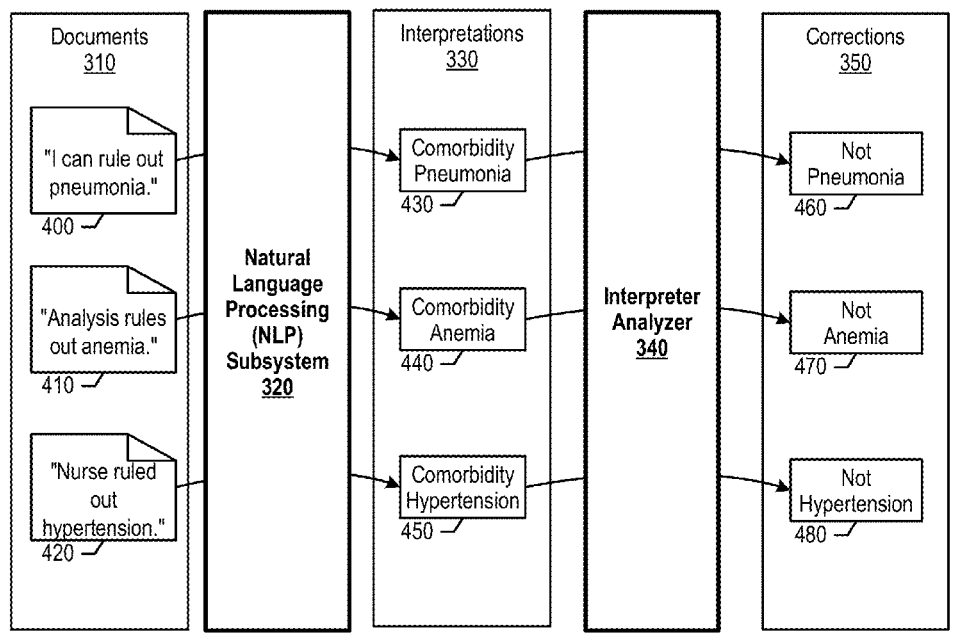
FIG. 4 an exemplary diagram depicting an interpretation analyzer generating corrections for incorrect document phrase interpretations.

Over time, interpretation analyzer 340 generates multiple corrections 350 from multiple interpretations 330. Corrections analyzer 360 receives corrections 350 and searches for patterns to determine whether natural language processing subsystem 320 consistently, or commonly, misinterprets a particular phrase in documents 310. Turning to FIG. 4, natural language processing subsystem 320 misinterprets the phrase "rule out" as being equivalent to "has" when in fact the correct interpretation is "does not have."

When corrections analyzer 360 identifies patterns in corrections 350, corrections analyzer 360 generates interpretation rules 370 to correct natural language processing subsystem 320's misinterpretations. Using the example above, interpretation rule 370 indicates, "rule out" is equivalent to "does not have." Corrections analyzer 360 provides interpretation rules 370 to natural language processing subsystem 320, which natural language processing subsystem 320 utilizes to analyze subsequent documents 310.

In one embodiment, natural language processing subsystem 320 utilizes interpretation rules to score new document phrases in a probabilistic manner. In this embodiment, natural language processing subsystem 320 may apply a sentence similarity algorithm on a new document phrase to generate a probabilistic score for the new document phrase based upon similarities between one of the interpretation rules. In turn, natural language processing subsystem 320 uses the probabilistic score to rank interpretations of the new document phrase.

FIG. 4 an exemplary diagram depicting an interpretation analyzer generating corrections for incorrect document phrase interpretations. FIG. 4 shows an embodiment pertaining to a medical domain. As those skilled in the art can appreciate, similar embodiments exist for other domains such as a law enforcement domain, a legal domain, etc.

Documents 310 include three phrases 400, 410, and 420, which may be included in a single document or in multiple documents. Natural language processing subsystem 320 applies a natural language processing learning model to the phrases and generates interpretations 430, 440, and 450. As can be seen, each of interpretations 430, 440, and 450 are incorrect for similar reasons because natural language processing subsystem 320 misinterprets the phrases "rule out" and "rules out."

Interpretation analyzer 340 reviews interpretations 430, 440, and 450, and generates corrections 460, 470, and 480 accordingly. In turn, corrections analyzer 360 compares corrections 350 with interpretations 330 and the corresponding phrases in documents 310 to determine if patterns exist in natural language processing subsystem 320's misinterpretations (see FIGS. 5, 8, and corresponding text for further details).

Figure 5:
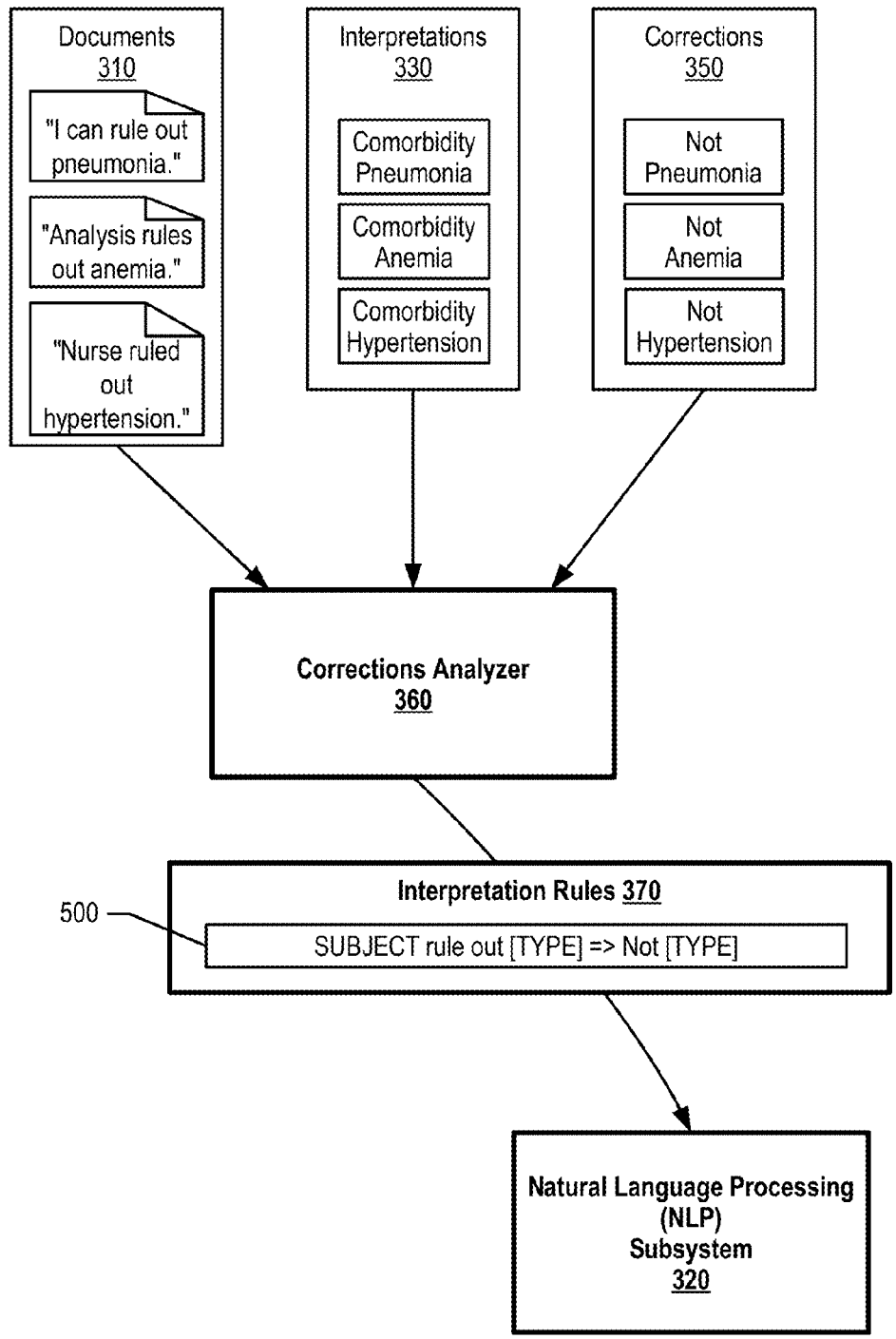
FIG. 5 is an exemplary diagram depicting a corrections analyzer searching for misinterpretation patterns.

FIG. 5 is an exemplary diagram depicting a corrections analyzer searching for misinterpretation patterns. FIG. 5 shows an embodiment pertaining to a medical domain. As those skilled in the art can appreciate, similar embodiments exist for other domains such as a law enforcement domain, a legal domain, etc.

Continuing from FIG. 4, corrections analyzer 360 receives corrections 350 and retrieves corresponding interpretations 330 and documents 310. In one embodiment, interpreter analyzer 340 provides a portion of interpretations 330 and documents 310 so corrections analyzer 360 does not retrieve the corresponding interpretations or document phrases.

Corrections analyzer 360 determines that the incorrect interpretations stem from natural language processing subsystem 320 misinterpreting the phrase "rule out." As such, corrections analyzer 360 generates interpretation rule 500 as part of interpretation rules 370 to train natural language processing subsystem 320 to correctly interpret the phrase "rule out." Interpretation rule 500 includes a SUBJECT, the phrase "rule out," and TYPE. In turn, when natural language processing subsystem 320 analyzes a subsequent medical document that includes "Nurse X rules out cancer," natural language processing subsystem 320 generates an interpretation of "not cancer."

Figure 6:
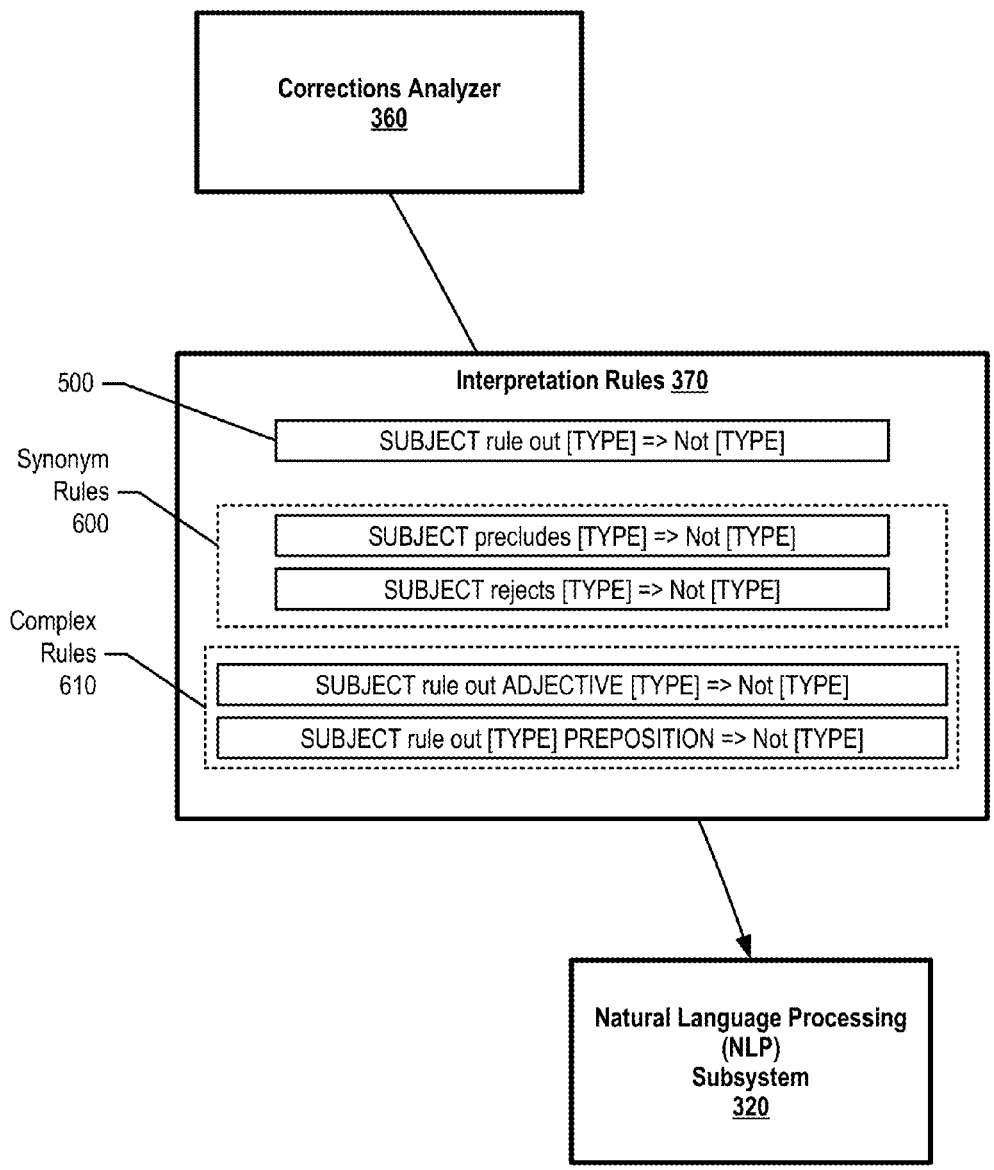
FIG. 6 is an exemplary diagram depicting a corrections analyzer generating synonym interpretation rules and complex interpretation rules that correspond to a new interpretation rule.
Figure 8:
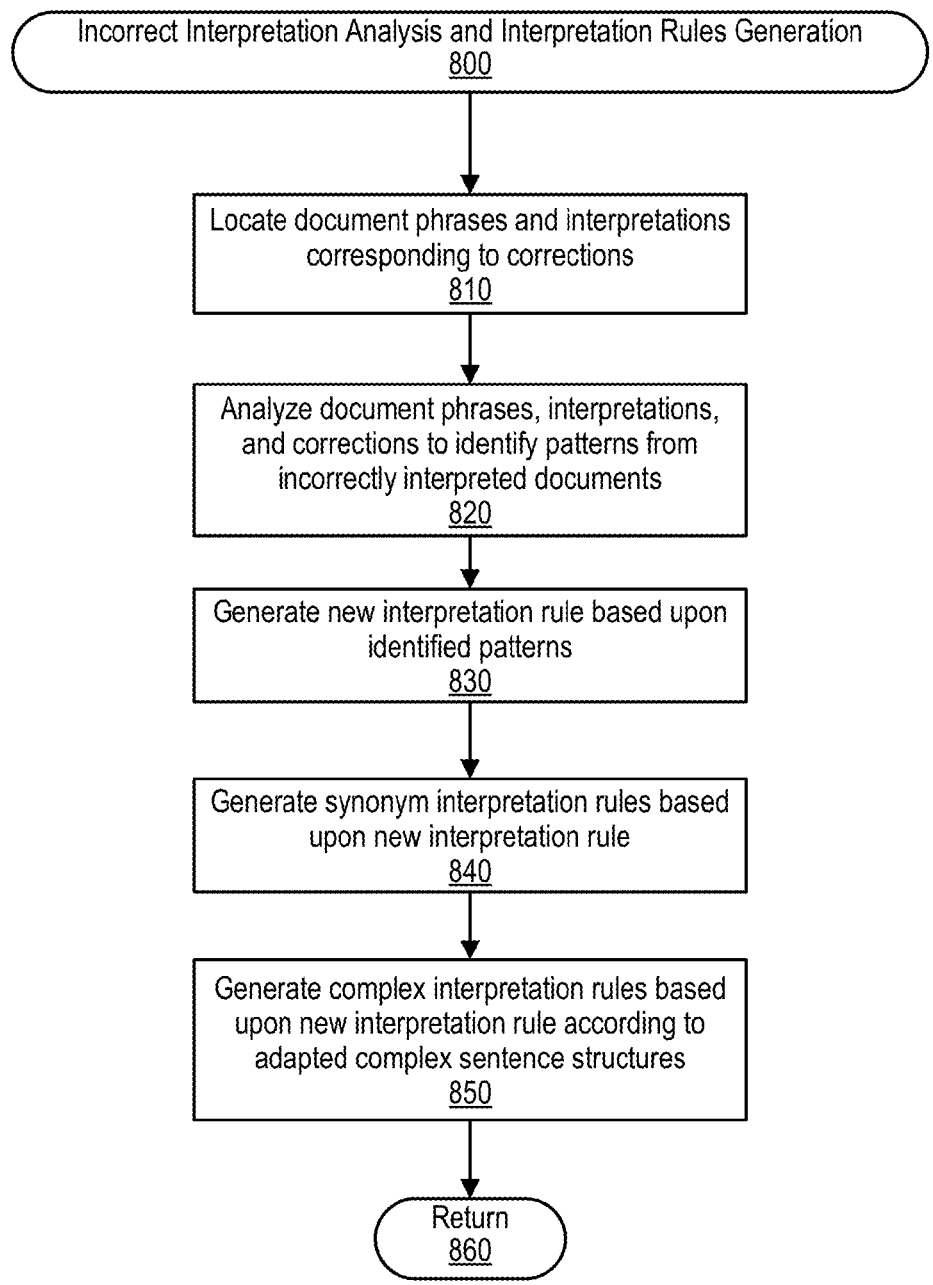
FIG. 8 an exemplary flowchart depicting steps to generate new interpretation rules based upon comparing document phrases, interpretations, and corrections.

In one embodiment, corrections analyzer 360 generates additional interpretation rules to cover synonyms, complex sentences, etc. based upon interpretations rule 370 (see FIGS. 6, 8, and corresponding text for further details).

FIG. 6 is an exemplary diagram depicting a corrections analyzer generating synonym interpretation rules and complex interpretation rules that correspond to a new interpretation rule. As shown in FIG. 5, corrections analyzer 360 generated new interpretation rule 500 based upon identifying an incorrect interpretation pattern in interpretations 330.

In one embodiment, corrections analyzer 360 also generates synonyms interpretation rules 600 or complex interpretation rules 610 to correspond with interpretation rule 500. Synonyms interpretation rules include synonyms of "rules out," which are "precludes" and "rejects." Complex interpretation rules 610 include adjective placeholders before the type and preposition placeholders after the type. In one embodiment, the process determines the complex patterns from corrections 350. For example, one of corrections 350 may be "nurse rules out hypertension" and another one of corrections 350 may be "nurse confidently rules out presence of hypertension," which both map to "NOT hypertension." In another embodiment, the process automatically inserts placeholders into simple interpretation rules to generate complex interpretation rules.

In turn, natural language processing subsystem 320 loads interpretation rules 370 into the learning model for improved documentation interpretation accuracy.

Figure 7:
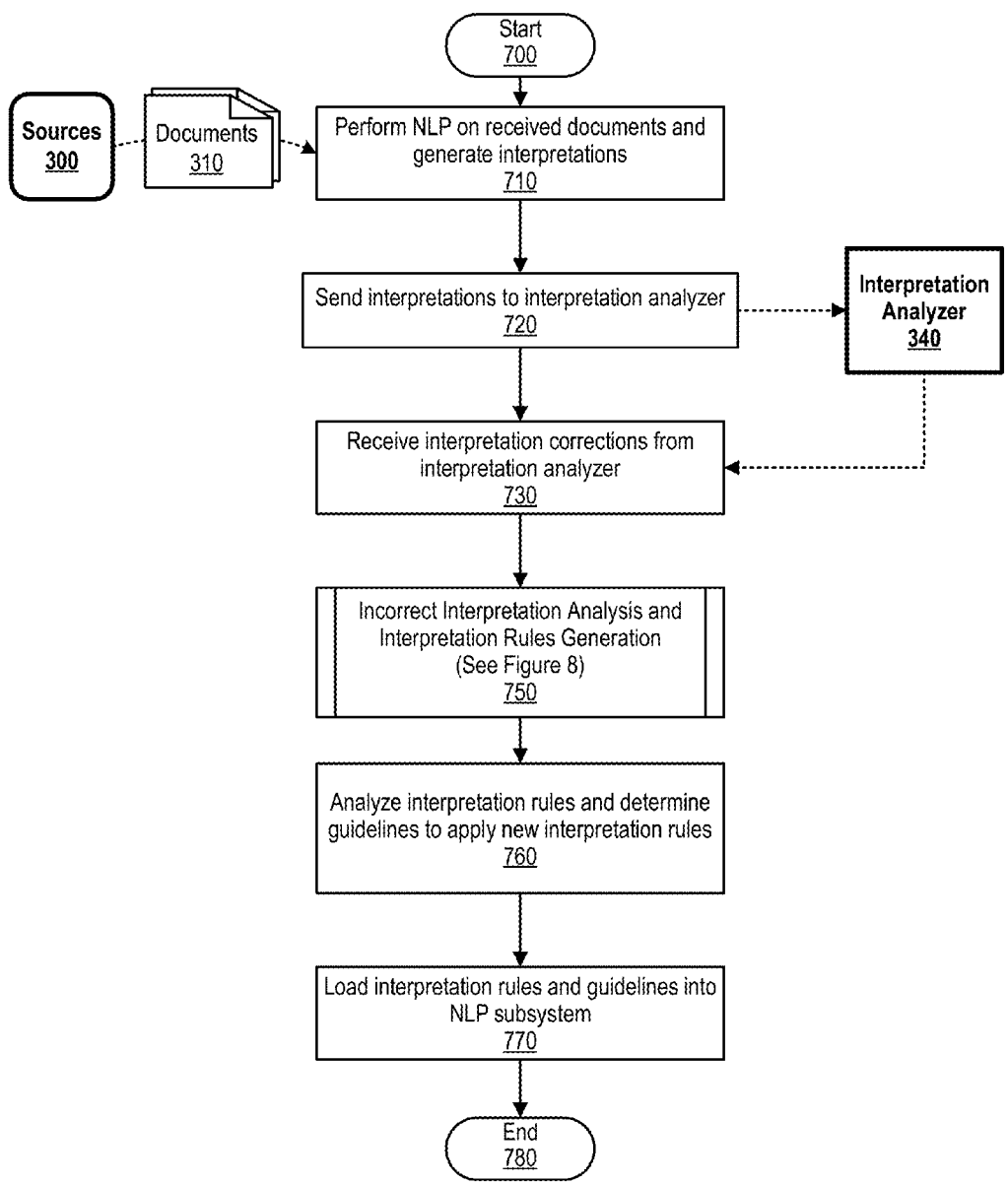
FIG. 7 is an exemplary flowchart depicting steps to update a natural language processing model by identifying patterns in interpretation corrections and adjusting the natural language processing model accordingly.

FIG. 7 is an exemplary flowchart depicting steps to update a natural language processing model by identifying patterns in interpretation corrections and adjusting the natural language processing model accordingly. Processing commences at 700, whereupon the process performs natural language processing on documents 310 to generate interpretations, such as performing natural language processing on a patient's medical records (step 710)

At step 720, the process sends the interpretations to interpretation analyzer 340. In one embodiment, interpretation analyzer 340 is a user such as a doctor, a detective, a paralegal, etc. In another embodiment, interpretation analyzer 340 may be a computer system capable of determining whether the interpretations are correct.

Next, at step 730, the process receives multiple corrections from interpretation analyzer 340. The corrections may include a modification to the interpretation, such as changing "Comorbidity Pneumonia" to "Not Pneumonia." At predefined process 750, the process compares the multiple corrections with the interpretations and the corresponding document phrases in documents 310 to determine whether a pattern exists with incorrect phrase interpretations (see FIG. 8 and corresponding text for processing details).

At step 760, the process analyzes proposed interpretation rules generated from pre-defined process block 750, and determines guidelines as to when to apply the new interpretation rules. In one embodiment, the process uses sentence similarity/statistical measures to determine whether the interpretation rules are sufficient and when to apply the new interpretation rules (e.g., match minus adjective=score 90%, match minus preposition=40%, etc.). In this embodiment, the process analyzes a phrase's grammar structure or a predicate-argument-structure that includes other parts of speech utilized within the grammar sentence structure. In this embodiment, adjectives, prepositions, etc. may have a higher complexity statement that slightly alters the result.

In another embodiment, the process may use a sentence similarity score to refine the interpretation rules. In this embodiment, the process adds or deletes a preposition or certain prepositions to an interpretation rule to improve the sentence similarity score when applying the interpretation rule to subsequent document analysis, such as changing <subject> <statement phrase> <object> to <subject> <statement phrase> <object> <preposition>.

At step 770, the process loads the updated interpretation rules and guidelines into the natural language processing subsystem. FIG. 7 processing thereafter ends at 780.

FIG. 8 an exemplary flowchart depicting steps to generate new interpretation rules based upon comparing document phrases, interpretations, and corrections. Processing commences at 800, whereupon the process locates document phrases and interpretations corresponding to interpretations (step 810) such as by requesting the document phrases and interpretations from natural language processing subsystem 320.

At step 820, the process analyzes the document phrases, interpretations, and corrections to identify similarities from incorrectly interpreted documents. Referring to FIG. 5, the process compares document phrases in documents 310 with interpretations 330 and corrections 350 using semantic and syntactic analysis techniques.

At step 830, the process generates a new interpretation rule based upon identifying a pattern of incorrect interpretations. Referring back to FIG. 5, the process determines that "rule out" is incorrectly interpreted as "has" when the phrase should be interpreted as "does not have."

At step 840, in one embodiment, the process generates synonym interpretation rules based upon new interpretation rule. Referring back to FIG. 6, the process determines that "precludes" and "rejects" are synonyms to "rule out". As such, the process generates synonym interpretation rules 600.

At step 850, in one embodiment, the process generates complex interpretation rules based upon new pattern and adapted complex sentence structures. Referring back to FIG. 6, the process determines that a complex sentence may include adjectives before [TYPE] or prepositions after [TYPE], such as by using English Slot Grammar (ESG) parsing techniques. In turn, the process generates complex interpretation rules 610. FIG. 8 processing thereafter returns to the calling routine (see FIG. 7) at 860.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
    generating a plurality of interpretations of a plurality of document phrases using a natural language processing model, wherein the plurality of interpretations are different than the plurality of document phrases;
    receiving a plurality of corrections corresponding to a set of words included in the plurality of interpretations;
    determining one or more misinterpretation patterns in response to evaluating the plurality of corrections against the plurality of interpretations and the plurality of document phrases;
    generating one or more interpretation rules based upon the one or more misinterpretation patterns;
    generating a synonym interpretation rule of a selected one of the one or more interpretation rules, wherein the synonym interpretation rule includes a synonym word of a selected one of the set of words included in the selected interpretation rule;
    applying the one or more interpretation rules and the synonym interpretation rule to the natural language processing model; and
    evaluating a new document phrase by the natural language processing model, wherein the evaluating further comprises:
        generating a probabilistic score of the new document phrase based upon a sentence similarity between the new document phrase and the one or more interpretation rules or the synonym interpretation rule; and
        ranking, based on the probabilistic score, a new interpretation of the new document phrase.

2. The method of claim 1 further comprising:
    determining a correct interpretation of the set of words in response to detecting that each of the plurality of interpretations are incorrect; and
    including the first set of words and the correct interpretation in a first one of the one or more interpretation rules.

3. The method of claim 2 further comprising:
    identifying one or more complex sentence patterns corresponding to the first interpretation rule based upon one or more complex sentence structures, wherein each of the one or more complex sentence patterns include one or more additional entities selected from the group consisting of an adjective and a preposition; and
    generating one or more complex interpretation rules based upon the one or more complex sentence patterns, wherein each of the one or more complex interpretation rules includes the set of words, the correct interpretation, and one or more of the additional entities.

4. The method of claim 1 wherein the natural language processing model performs syntactic analysis and semantic analysis on each of the plurality of document phrases.

\* \* \* \* \*